United States Patent
Gilleo et al.

[11] 3,915,931
[45] Oct. 28, 1975

[54] ORGANIC POLYMER FLAME RETARDANTS BASED ON SULFAMIDE

[75] Inventors: Kenneth B. Gilleo, Depew; Francis E. Evans, Hamburg, both of N.Y.

[73] Assignee: Allied Chemical Corporation, New York, N.Y.

[22] Filed: Dec. 17, 1973

[21] Appl. No.: 425,487

[52] U.S. Cl. ......... 260/45.9 R; 106/15 FP; 117/136; 117/137; 117/138; 260/2.5 AJ; 260/45.9 NC; 260/45.9 NP
[51] Int. Cl.$^2$ ............................................. C08G 6/00
[58] Field of Search .............. 260/45.9 R, 45.9 NC, 45.9 NP, 260/2.5 AJ, 77.5 SS; 106/15 FP; 117/136, 137, 138

[56] References Cited
UNITED STATES PATENTS

| | | | |
|---|---|---|---|
| 2,319,954 | 5/1943 | Scott | 260/45.9 R |
| 2,935,471 | 5/1960 | Aarons et al. | 252/8.1 |
| 3,409,463 | 11/1968 | LeBlanc et al. | 117/143 |
| 3,574,148 | 4/1971 | Windemuth et al. | 260/2.5 AJ |
| 3,730,939 | 5/1973 | Koch et al. | 260/45.9 R |

OTHER PUBLICATIONS

Chem. Abstracts, Vol. 77, 1972 No. 49392h p. 43.

Chem. Abstracts, Vol. 76, 1972 No. 128134h p. 50.

*Primary Examiner*—V. P. Hoke
*Attorney, Agent, or Firm*—Anthony J. Stewart; Jay P. Friedenson

[57] ABSTRACT

A nitrogen containing organic polymer composition and process for preparing same comprising treating a nitrogen containing organic polymer with from about 0.5 to about 25 weight percent of substituted or unsubstituted sulfamide.

26 Claims, No Drawings

ORGANIC POLYMER FLAME RETARDANTS BASED ON SULFAMIDE

This invention relates to nitrogen containing natural or synthetic organic polymers exhibiting improved flame resistance. More specifically this invention relates to nitrogen containing natural or synthetic organic polymers treated with compositions which impart improved flame resistance thereto and to the process of so treating the polymers.

In the prior art numerous compounds have been used as additives to nitrogen containing polymers including nylon (polycarbonamides), and polyurethanes, in an attempt to reduce flammability of the polymers. For example inorganic and organic tin compounds and halogen containing compounds have been used to reduce flammability of nylon. These compounds have not, however, been entirely successful.

In addition to the tin containing compounds and halogen containing compounds, some compounds, containing nitrogen and sulfur have been employed to improve flame resistance. For example thiourea and compounds containing noncyclic imine groups have been used. Thiourea, while being an improvement over the tin and halogen compounds still does not create as much flame resistance as is desired or necessary. The compounds containing imine groups do not give the desired flame resistance, and, since the imine group hydrolyzes when contacted with water, the formation of a permanent application of the compounds to the nylon or other nitrogen containing polymers is prevented. Other compounds containing both sulfur and nitrogen which have been suggested to impart flame resitance to nitrogen containing polymers such as nylon have been found to be inadequate since they contain too much carbon in relation to the amount of other elements present in the compound or the carbon is present in a single flammable chain of excessive length, which chain will easily burn.

Other sulfur-nitrogen compounds which have been used are sulfamic acid and ammonium sulfamate. Sulfamic acid is a strong acid and degrades polymers to which it is added. In addition neither sulfamic acid nor ammonium sulfamate impart the desired degree of flame resistance to nitrogen containing polymers.

BRIEF DESCRIPTION OF THE INVENTION

In accordance with the process of this invention it has now been discovered that nitrogen containing natural or synthetic organic polymers can be treated with from about 0.5 to about 25 weight percent of certain additive compounds containing sulfur and nitrogen to give them a flame resistance which is superior to the flame resistance obtainable by any known prior art compound or method. The additive compounds with which the nitrogen containing polymer is treated are substituted and unsubstituted sulfamides having the formula:

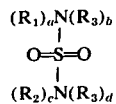

wherein $R_1$ and $R_2$ are independently at each occurrence hydrogen, a phosphoryl group, mono or divalent alkyl groups of up to 5 carbon atoms which may contain oxygen, sulfur, nitrogen, halogen or phosphorous; or M where M is an ion having a single positive charge selected from the simple or complex ions of Group I A or Group II A metals; and $R_3$ is independently at each occurrence a group having the formula:

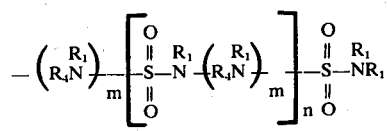

where $m$ is independently at each occurrence 0 or 1, $n$ is 0 to 5 and $R_4$ independently at each occurrence is an alkylene group of up to 5 carbon atoms which may contain oxygen, sulfur, nitrogen, halogen or phosphorous; $a$, $b$, $c$ and $d$ are 0 to 2 provided that the sum of $a$ and $b$ is 2 when $R_1$ is monovalent and 1 when $R_1$ is divalent and the sum of $c$ and $d$ is 2 when $R_2$ is monovalent and 1 when $R_2$ is divalent.

The novel compositions in accordance with the invention comprise nitrogen containing polymers treated with from about 0.5 to about 25 weight percent of a compound or a mixture of compounds having the above formula.

DETAILED DESCRIPTION OF THE INVENTION

In accordance with this invention certain nitrogen containing natural or synthetic organic polymers particularly wool, silk, acrylic, nylon, and urethane polymers are treated with at least about 0.5 weight percent, preferably at least about 2 weight percent and most preferably at least about 4 weight percent of a compound, or a mixture of compounds falling within the above formula. Generally less than about 25 weight percent, preferably less than about 15 weight percent and most preferably less than about 10 weight percent of the compound or mixture of compounds is used. While higher pecentages can be used, they do not materially increase flame resistance and can cause undesirable effects such as flaking on the surface of the polymer.

The polymer is preferably treated by wetting the surface with a solution, e.g., aqueous solution, or emulsion containing one or more of the above compounds. The solution or emulsion generally contains from about 0.02 to 50 weight percent of said compound and preferably contains from about 2 to about 8 percent of said compound. Any suitable liquid vehicle may be used for the application of the compound. Examples of such vehicles are water and alcohol. Other suitable vehicles will be apparent to those skilled in the art. Another method for treating the polymer is by adding the compound to the reaction product used in manufacture of the polymer, e.g., from about 1.0 to about 25 weight percent and preferably from about 2 to about 8 weight percent of compound may be added to polyol which is used in manufacturing polyurethane. The compound is preferably dissolved in water prior to its addition to the polyol. The most preferred compound for use in treating the polymer is sulfamide.

$R_1$ and $R_2$ in the above formula are hydrogen, phosphoryl groups, mono or divalent alkyl groups of up to 5 carbon atoms which may contain oxygen, sulfur, nitrogen, halogen or phosphorous; or M, but are not heterocyclic rings due to resulting instability.

Such alkyl groups are unsubstituted alkyl groups; or sulfur, oxygen, amino, halo, hydroxy, alkoxy, mercapto, halo, thioalkyl, ether, ester, carboxy, keto or phosphorous substituted alkyl groups. Examples of such substituted lower alkyl groups are:

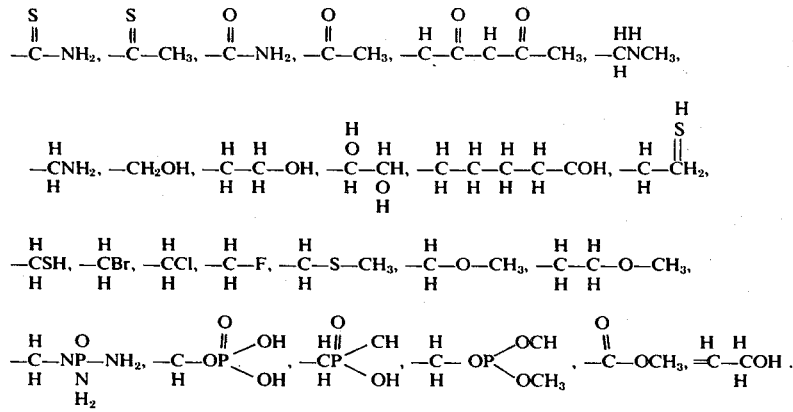

M is an ion or a complex ion of a Group I A or Group II A metal having a single positive charge. "Complex ion" as used herein means an ion formed by the combination of an ion of ammonium or a Group I A or group II A metal with another ion or with an atom or a molecule. The preferred Group I A metal is lithium and the preferred group II A metals are calcium and magnesium. An example of a complex ion as contemplated by this invention is

While halogens may be used to substitute within the $R_1$ or $R_2$ alkyl group, halogen substitution is not preferred in that halogens tend to degrade nylon and increase smoke formation in polyurethane.

The carboxy groups while acceptable are not preferred in that they are believed to contribute to degradation of the polymer.

"Phosphoryl group" as used herein means a group containing a phosphorous atom which group is directly bonded by the phosphorous atom to the nitrogen atom in the above general formula for the additive compounds. Examples of such phosphoryl groups are $=PCl_3$, $=P(NH_2)_3$,

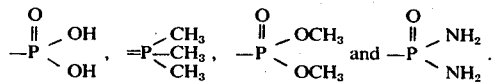

Essentially any phosphorous containing group can be substituted into the $R_1$ or $R_2$ alkyl group, however, phosphorous containing groups, whether a phosphorous containing alkyl or a phosphoryl group, while suitable are not preferred in that they are also believed to contribute to degradation of the polymer and may emit toxic substances during combustion.

Of the phosphorous containing groups phosphates, phosphonates, phosphonamides are most preferred.

The $R_3$ group is a group which independently at each occurrence has the general formula:

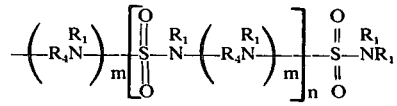

where $m$ is independently at each occurrence 0 or 1, $n$ is 0 to 5 and $R_4$ independently at each occurrence is an alkylene group of up to 5 carbon atoms which may contain oxygen, sulfur, nitrogen, halogen or phosphorous. Such groups may be unsubstituted, or a sulfur, oxygen, amino, halo, hydroxy, alkoxy, mercapto, thioalkyl, ether, ester, carboxy, keto or phosphorous substituted, lower alkylene groups of from 1 to 5 carbon atoms.

Specific examples of substituted or unsubstituted alkylene groups which are suitable as $R_4$ groups are:

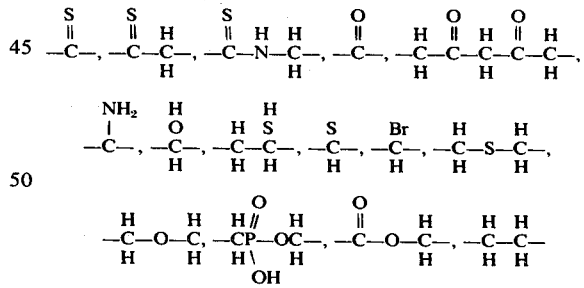

Particularly suitable $R_3$ groups are:

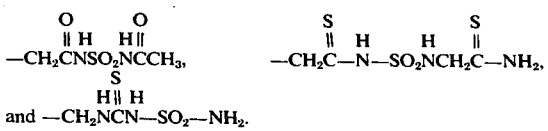

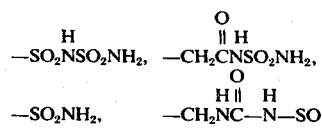

Examples of specific additive compounds of this invention which have been found particularly useful in forming flame resistant nitrogen containing polymer compositions, such as flame resistant nylon and flame resistant polyurethane, with a suggested formula for preparation are as follows:

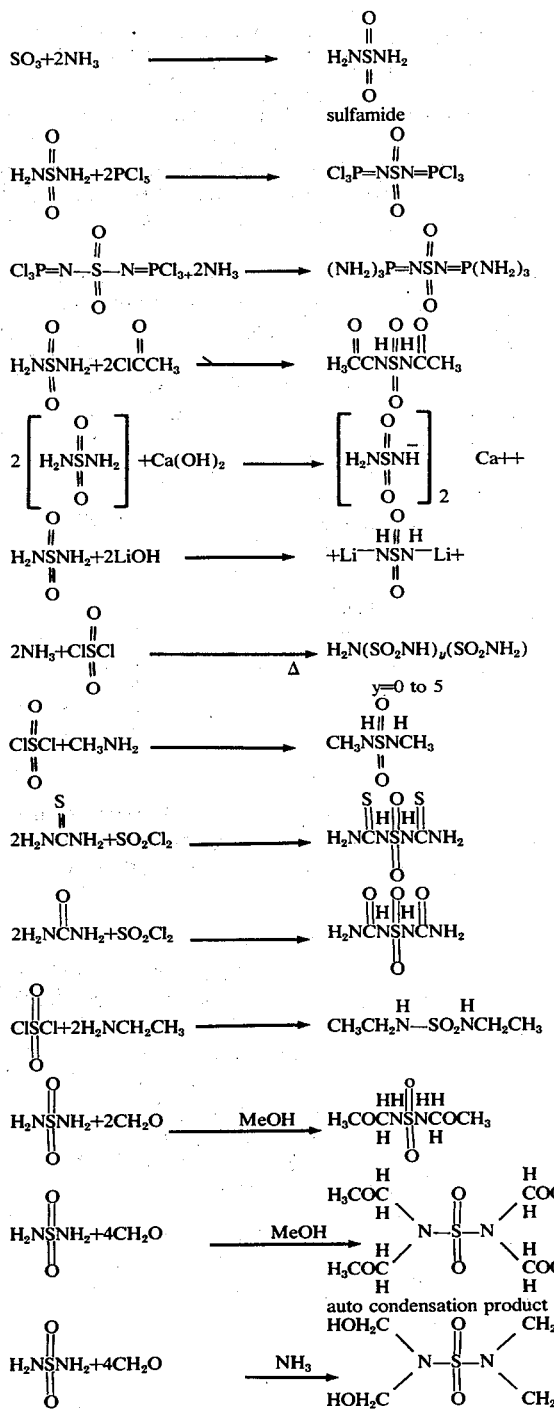

In practicing this invention one of the compounds of the formula:

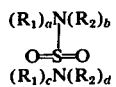

as described herein, is dissolved in solvent, usually water to make a solution of about 0.5 to about 12 weight percent, and more preferably from about 2 to about 8 weight percent and most preferably from about 4 to about 6 weight percent. The nitrogen containing polymer, usually in the form of fabric or carpet, is then soaked in the solution which may contain other additives commonly used in finishing baths to improve properties such as water repellency. The fabric or carpet is then squeezed in a suitable apparatus such as pad rollers to remove excess solution. The squeezing apparatus, such as the rollers is adjusted to give from about 25 to about 300 weight percent, preferably from about 50 to about 200 weight percent and most preferably from about 75 to 150 weight percent wet pickup. The fabric or carpet is then dried in air or in a dryer oven at temperatures up to about 150°C. but preferably less than about 125°C. The solution may be applied to the nitrogen containing polymer in numerous ways. For example, the material may be immersed in the solution or the solution may be sprayed upon the material or applied to the material by means of pad rolls.

The dry material can be tested for flame retardancy by several methods. In the case of apparel fabric, the Children's Sleepwear Standard is used. A 1½ inch flame from a bunsen burner is applied to the lower edge of a vertically supported fabric. Untreated (control) fabric may burn completely while fabrics of the compositions of this invention usually stop burning when the bunsen burner flame is removed indicating that in the absence of an externally applied elevated temperature, which may be in the form of a flame, the material is usually self extinguishing.

Upholstery, tapestry and drapery fabrics are tested by holding the fabric over a 1½ inch bunsen burner flame for up to 12 seconds. Untreated fabrics may burn for several minutes while fabrics made from the compositions of this invention usually extinguish from 0 to 5 seconds after removal of the burner flame. The additive compounds of this invention are generally much more effective than known prior art compounds for increasing flame resistance of nitrogen containing polymers. For example as little as 0.5 dry weight percent of those compounds described above effectively reduce flammability of nylon upholstery fabric while as much as 50 to 100 weight percent prior art phosphorous or halogen containing compounds may be required to accomplish the same result.

In addition, the additive compounds of this invention are more effective in increasing the flame resistance of polyurethane than prior art compounds and the additive compounds of this invention unexpectedly effectively inhibit smoke emission from burning polyurethane. Such smoke inhibition is very desirable in that smoke from burning nitrogen containing polymers frequently prevents escape from a fire by obscuring the escape route.

The following examples serve to illustrate the process and composition of the invention. Unless otherwise indicated all parts and percentages are by weight.

EXAMPLE 1

A 4 inch by 4 inch piece of nylon 6 carpet backed with jute is dipped into a pad bath solution consisting of six percent sulfamide in water and is squeezed through a wringer (laboratory padder) to obtain a weight pickup (weight increase) of 180 percent corresponding to a dry chemical add-on of about 11 percent sulfamide. The sample is dried in a horizontal position in a circulating oven at 140°C. for one hour. The sample is then placed in a desiccator containing CaSO₂ drying agent and allowed to cool for 15 minutes. The sample is tested using a modified United States Department of Commerce test DOC FF1-70 wherein a 250 watt heat lamp is positioned five inches from the carpet surface and is controlled by a Variac. The lamp is turned on for five minutes at 90 volts on the Variac in order to provide a more vigorous test. The higher the voltage applied to the heat lamp the greater the heat applied to the carpet prior to burning the carpet. The carpet is burned by placing a 150 mg. methenamine pellet in the center of the carpet. The pellet is then ignited. The treated carpet self extinguishes 45 seconds after the pellet has finished burning. The carpet is considered passing at the preset voltage if it self extinguishes within 60 seconds after the pellet has finished burning.

The higher the voltage which can be applied to the heat lamp before the carpet fails the better the flame resistant properties of the carpet.

EXAMPLES 2 – 8

The procedure of Example 1 is followed except the weight percent of sulfamide added to the carpet is varied.

The following table I shows the highest voltage applied by the heat lamp, the burn time, the burn area resulting from the test and the percentages of additive to the carpet.

TABLE I

| EX. | % ADD ON | VOLTAGE | BURN TIME | BURN AREA |
|---|---|---|---|---|
| 2 | 0 | 0 | 80 seconds | 3.25 sq. in. |
| 3 | 3.5 | 0 | 1 second | 2.5 sq. in. |
| 4 | 3.5 | 60 | 1 second | 2.5 sq. in. |
| 5 | 3.5 | 90 | 80 seconds | 3.5 sq. in. |
| 6 | 5.8 | 0 | 1 second | 2.5 sq. in. |
| 7 | 5.8 | 90 | 5 seconds | 2.75 sq. in. |
| 8 | 5.8 | 120 | 80 seconds | 5.5 sq. in. |

This table shows that only those samples which were treated with sulfamide retained flame resistance when subjected to the heat of the lamp.

EXAMPLES 9 – 11

Samples of flexible foam are made as follows: 100 g. of a 2,000 average molecular weight polyol manufactured by reacting a triol with propylene oxide is added to a 1 quart metal can. Four g. of water, 1.2 g. of a silicon surfactant comprising a block copolymer of polysiloxane and polyethylene glycol, 0.2 g. of stannous octoate and 0.3 g. of a 33 percent solution of triethylene diamine in dipropylene glycol are then added. The mixture is then stirred with a constant torque mixture for 1 minute. Sulfamide, if any, is then added followed by an additional two minutes of stirring.

50 g. of toluene diisocyanate is added to the mixture and the resulting composition is stirred for 15 seconds. The composition is poured into a cardboard container and allowed to rise. The sample is allowed to stand overnight before cutting and testing.

The samples are tested for flame retardancy using both the motor vehicle safety standards (MVSS) 15 second ignition test No. 302 and ASTM 60 second ignition test No. 1692.

The MVSS-302 test is conducted in a metal cabinet for protecting the sample from drafts. The sample is supported in the cabinet and a 1½ inch high flame from a ⅜ inch bunsen burner is held ¾ of an inch below one end of the sample. The burn rate is then calculated from the formula B=60 × D/T where B equals burn rate in inches per minute, D equals length the flame travels in inches, and T equals time in seconds for the flame to travel D inches.

ASTM test 1692 is conducted by placing the sample on a horizontal wire mesh and exposing one end of the sample to a 1½ inch high blue flame from a bunsen burner having a wing top. After 60 seconds the burner is removed and the time of burn for a burn distance of 5 inches is measured. The burn rate in inches per minute is then calculated.

The following Table II sets forth the weight percent of sulfamide used and the test results using both the MVSS-302 15 second ignition test and the ASTM-1692 60 second ignition test for examples 9, 10 and 11.

TABLE II

| EXAMPLE | SULFAMIDE | MVSS-302 | | | ASTM 1692 | | |
|---|---|---|---|---|---|---|---|
| | | secs. | ins. | ins./min. | secs. | ins. | ins./min. |
| 9 | 0 | 80 | 9 | 6.65 | 55 | 5 | 5.45 |
| 10 | 2% | 51 | 3.75 | 4.41 | 73 | 5 | 4.13 |
| 11 | 3% | 0 | 0 | 0 | 78 | 5 | 3.58 |

It is clear from the results in Table II that an addition of 2 – 3 percent sulfamide substantially enhances flame resistance by reducing burn rate under the test conditions.

EXAMPLE 12

The procedure of Example 11 is followed except 3 percent sulfamide is dissolved in 4 grams of water by mixing the sulfamide with the water and applying heat. The 4 grams of water is then added to the mixture as in Example 1.

The resulting foam is then tested using ASTM test 1692. The burning time after removal of the bunsen burner flame is about 26 seconds, the distance of burn is about 1.25 inches and the rate of burn is about 2.9 inches per minute. This example shows, when compared with Example 11, that dissolving the sulfamide in water prior addition to the polyol mixture substantially reduces the comparative burn rate.

EXAMPLE 13

The procedure of Example 1 is followed except 2.5 percent sulfamide is incorporated into the polyol mixture prior to addition of the toluene diisocyanate and the resulting foam is tested for smoke emission in comparison with foam into which no sulfamide is incorporated. The test used is the Nation Bureau of Standards (NBS) smoke density chamber test. For a general discussion of this type of test see ASTM STP Publication 422.

Briefly a 3 inch by 3 inch sample is clamped in a sealed chamber having 3 foot by 3 foot by 3 foot dimensions. The sample is clamped in such a way that an area measuring 2-9/16 inches by 2-9/16 inches is exposed to an irradiation of 2.2 BTU's per second per foot squared at a sufficient distance to obtain an irradiation of 2.5 watts per square centimeter on the sample and defined ignitor flames are placed beneath the sample. The percent transmittance is then measured with a light source and photocell and the optical density ($D_s$) is then calculated from the formula:

$$D_s = \frac{V \times \text{Log}_{10}(100/t)}{A \times L}$$

where V is the Volume of the chamber, $t$ is the transmittance, A is the area of exposed sample and L is the distance between the light source and the photocell.

The calculation is then corrected for residual optical density in the chamber due to smoke condensation and other factors.

A comparison of the control without sulfamide and the sample containing 2.5% sulfamide shows that after a time period of 90 seconds the test for the sample containing sulfamide resulted in an optical density of about 35 whereas the test for the control resulted in an optical density of about 55 indicating that after the 90 second period the sample containing the sulfamide emitted substantially less smoke under the test conditions.

The maximum optical density reached during the test of the sample containing sulfamide was less than 100 whereas the maximum optical density reached during the test of the control sample is over 200 indicating that substantially less smoke is formed by the sample containing sulfamide than by the control sample under the test conditions.

What is claimed is:

1. A process for improving flame resistance of nitrogen containing natural or synthetic organic polymers consisting essentially of treating the polymers with from about 0.5 to about 10 weight percent of a compound of the formula:

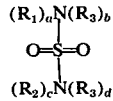

wherein $R_1$ and $R_2$ are, independently at each occurrence, hydrogen; a mono or divalent alkyl group of up to 5 carbon atoms which may contain oxygen, sulfur, or nitrogen; or M, where M is an ion having a single positive charge selected from the simple or complex ions of Group I A or Group II A metals and $R_3$ is independently at each occurrence a group having the formula:

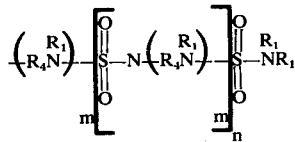

where $m$ is independently at each occurrence 0 or 1, $n$ is 0 to 5 and $R_4$ independently at each occurrence is an alkylene group of up to 5 carbon atoms which may contain oxygen, sulfur, or nitrogen; $a$, $b$, $c$ and $d$ are 0 to 2 provided that the sum of $a$ and $b$ is 2 when $R_1$ is monovalent and 1 when $R_1$ is divalent and the sum of $c$ and $d$ is 2 when $R_2$ is monovalent and 1 when $R_2$ is divalent.

2. The process according to claim 1 wherein M is a simple ion of Li or a complex ion of Ca or Mg.

3. The process according to claim 1 wherein the polymer is wool, silk, acrylic, nylon or urethane polymer.

4. The process according to claim 1 wherein $b$ and $d$ are each 0 and $a$ and $c$ are each 2.

5. The process according to claim 4 wherein the polymer is nylon.

6. The process according to claim 4 wherein the polymer is polyurethane.

7. The process according to claim 5 wherein all $R_1$ and $R_2$ groups are —$CH_2OCH_3$.

8. The process according to claim 5 wherein all $R_1$ and $R_2$ groups are —H.

9. The process according to claim 6 wherein $R_1$ and $R_2$ are —$CH_2OCH_3$.

10. The process according to claim 6 wherein $R_1$ and $R_2$ are —H.

11. The process according to claim 3 wherein said compound contains at least one $R_3$ group, and $m$ is 0.

12. The process according to claim 11 wherein $R_4$ is $\text{--(CH}_2\text{)--}$ and $m$ is 1.

13. The process according to claim 11 wherein $R_4$ is

and $m$ is 1.

14. The process according to claim 11 wherein $m$ and $n$ are each 0 and the terminal $R_1$ in the $R_3$ group is

15. The process according to claim 1 wherein said polymer is treated by immersion in solution containing from 0.02 to 50 weight percent of said compound.

16. The process according to claim 15 wherein said solution is an aqueous solution.

17. The process according to claim 6 wherein from 1.0 to 25 weight percent of said compound is added to the polyol used in manufacturing said polyurethane.

18. The process according to claim 17 wherein said compound is dissolved in water prior to addition to said polyol.

19. The process according to claim 18 wherein said compound is sulfamide.

20. A composition comprising a nitrogen containing natural or synthetic organic polymer and from about 0.5 to about 10 weight percent of a compound of the formula:

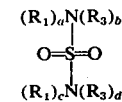

wherein $R_1$ and $R_2$ are, independently at each occurrence, hydrogen; a mono or divalent alkyl group of up to 5 carbon atoms which may contain oxygen, sulfur, or nitrogen; or M, where M is an ion having a single positive charge selected from the simple or complex ions of Group I A or Group II A metals and $R_3$ is independently at each occurrence a group having the formula:

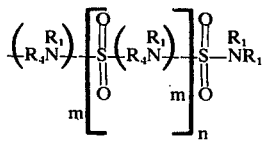

where *m* is independently at each occurrence 0 or 1, *n* is 0 to 5 and $R_4$ independently at each occurrence is an alkylene group of up to 5 carbon atoms which may contain oxygen, sulfur, or nitrogen; *a*, *b*, *c* and *d* are 0 to 2 provided that the sum of *a* and *b* is 2 when $R_1$ is monovalent and 1 when $R_1$ is divalent and the sum of *c* and *d* is 2 when $R_2$ is monovalent and 1 when $R_2$ is divalent.

21. A composition according to claim 20 wherein the organic polymer is nylon.

22. A composition according to claim 20 wherein the organic polymer is polyurethane.

23. A composition according to claim 21 wherein the compound is:

24. A composition according to claim 21 wherein the compound is the auto condensation product of:

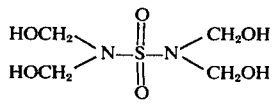

25. A composition according to claim 22 wherein the compound is:

26. A composition according to claim 21 wherein the compound is:

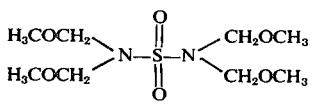

* * * * *